F. G. KOEHLER.
SHOCK ABSORBER FOR VEHICLES.
APPLICATION FILED MAY 13, 1909.
944,677.
Patented Dec. 28, 1909.
2 SHEETS—SHEET 1.
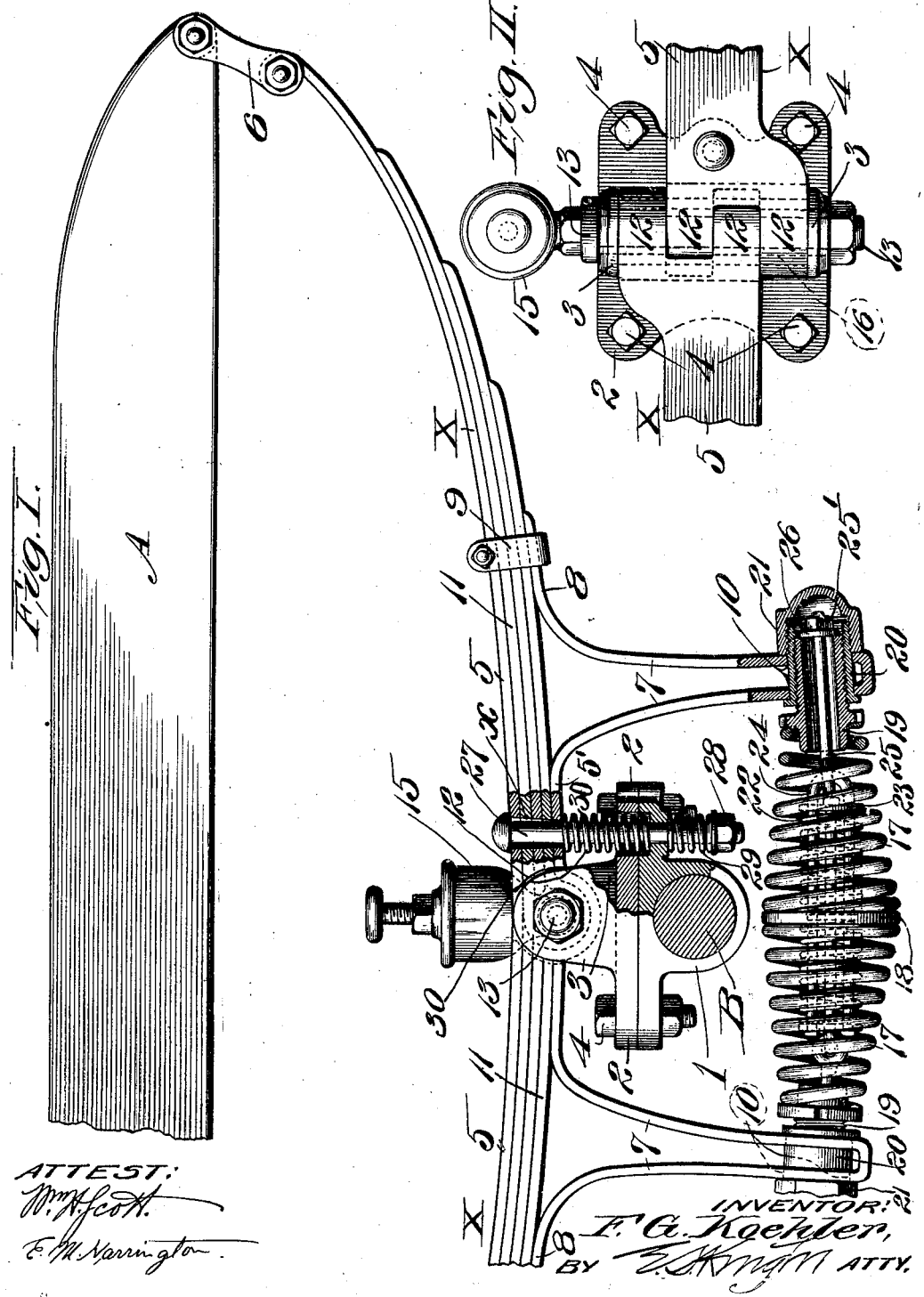

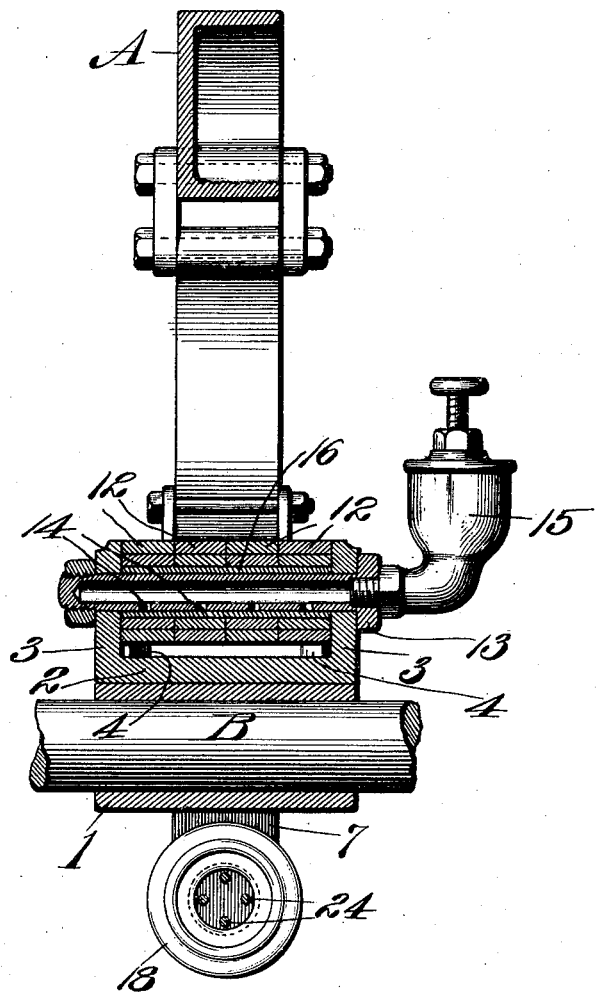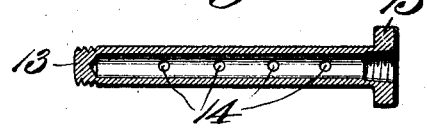

UNITED STATES PATENT OFFICE.

FRANK G. KOEHLER, OF ST. LOUIS, MISSOURI.

SHOCK-ABSORBER FOR VEHICLES.

944,677.

Specification of Letters Patent.   Patented Dec. 28, 1909.

Application filed May 13, 1909.   Serial No. 495,757.

*To all whom it may concern:*

Be it known that I, FRANK G. KOEHLER, a citizen of the United States of America, residing at the city of St. Louis, in the State of Missouri, have invented certain new and useful Improvements in Shock-Absorbers for Vehicles, of which the following is a full, clear, and exact description, reference being had to the accompanying drawings, forming part of this specification.

My invention relates to a shock absorber for use in vehicles of various descriptions, but more particularly intended to be utilized in motor vehicles and through the medium of which the transmission of shocks to the body of the vehicle may be materially lessened as compared with the transmission of such shocks to the body of the vehicle in instances where the ordinary springs supporting the vehicle body are used alone.

Figure I is partly a side elevation and partly a section of my shock absorber. Fig. II is a top or plan view of the connection between the main spring sections. Fig. III is a vertical section taken centrally through the parts illustrated in Fig. I. Fig. IV is a longitudinal section of the lubricant conducting bolt employed in connection between the main spring sections.

In the accompanying drawings:—A designates a member of the body frame of a vehicle and B one of the axles of the vehicle, these parts being of any ordinary construction.

The axle B has fixed to it, or formed integral therewith, a collar or seat member 1 that is surmounted by an ear block 2 provided with upright perforated ears 3, spaced apart from each other. The ear block is secured to the seat member 1 by any suitable means, such as bolts 4.

X designates a pair of laminated main spring sections, each of which extends laterally from the ears of the ear block 2 with which the sections have pivotal connection at their inner ends, as will hereinafter more fully appear, while the outer ends of the sections are pivotally and loosely connected to the vehicle frame member A by links 6. The spring sections X are so constructed as to provide for the upper lamination 5 of each section having connection with a link 6 and being curved downwardly and outwardly beneath the other laminations, as illustrated in Fig. I. so that a portion 5′ of the upper lamination will also occupy a position at the bottom of the spring section from which there extends a spring arm 7 depending from the spring section. Each spring arm 7 comprises a portion that extends downwardly from the lower portion 5′ of the lamination 5 and then upwardly to the bottom of the spring section, terminating in a lateral upper arm 8 that is seated beneath the spring section and is secured thereto by suitable means, such as a clip 9. The spring arms 7 are of sufficient length to extend to points beneath the horizontal line in which the axle B is located and said arms are provided with perforations 10 for the reception of members to be hereinafter fully set forth. While it is unessential in the construction of the spring sections X that more than the laminations 5 of said spring sections be curved at the inner ends of the sections, as explained, the lamination 11 next adjacent to the lamination 5 may be similarly curved, and I have so illustrated it in the drawings and I will, without limiting myself to the curvature of more than one lamination, refer to each spring section as having both the laminations 5 and 11 curved at the inner ends of the spring sections. The curved inner end portions of the laminations 5 and 11 are provided with ears 12 whereby the two spring sections X are fitted to each other in a manner to provide for the passage of a pivot bolt through the ears to pivotally connect the sections.

13 is a pivot bolt mounted in the ears 3 of the ear block 2 supported by the axle of the vehicle and which extends through the ears of the spring sections X, as seen most clearly in Fig. III. This pivot bolt is hollow and is provided with a plurality of perforations 14 through which lubricant delivered into the bolt may escape therefrom to lubricate the pivot bearing of which the bolt is a part.

15 is an oil cup fitted to the pivot bolt at one end and from which lubricant may be supplied to the bolt. The pivot bolt is preferably surrounded by a sleeve 16 interposed between the bolt and the ears of the main spring sections X to provide a bearing around the pivot bolt, but which may be dispensed with and the ears of the sections be permitted to have bearing directly on the bolt.

To provide cushioning resistance for the main spring sections X, I utilize between the spring arms 7 of said sections a compression cushion spring device that serves to yieldingly resist the movements of said arms toward each other and also a recoil cushion spring device that serves to yieldingly resist the reverse movement or rebound of the main spring sections after the compression cushioning device has been actuated.

17 designates compression cushion springs arranged in alinement with each other between the spring arms 7 and which have interposed between their inner ends a spring seat ring 18. The outer ends of these cushion springs bear against adjustable spring seat screws 19 that are mounted in bushings 20 set into the spring arms 7 and held therein by cap nuts 21. 22 is a recoil spring located within the compression cushion springs 17, and the outer ends of which rest against spring seat plates 23 that are carried by U-shaped draw rods 24 which are united at their outer ends to connecting rods 25 that extend through the adjustable spring seat screws 19 and have washers 26 and nuts 25' applied to their outer ends, the washers being arranged against the outer ends of the spring seat screws, as clearly seen in Fig. I.

While I have described herein the compression cushion springs and recoil springs 22 and the parts by which these springs are held in association with the spring arms 7 of the main springs X, I desire it understood that I make no claim herein for such specific arrangement of these parts *per se*, inasmuch as they are included in a separate application for patent filed by me May 7, 1908, Serial Number 431,344.

In the practical use of my shock absorber, the main springs X act as supports or bearers for the frame of a vehicle, in which the shock absorber is incorporated, and act under normal conditions in conjunction with the parts coöperable therewith to yieldingly support the load imposed thereon. In the event, however, of the running gear of the vehicle being subjected to a shock due to one or more of the ground wheels of the vehicle striking an obstruction or moving into a depression in the roadway, the outer portions or arms of the main springs move downwardly to such degree as to cause the spring arms 7 of said springs to approach each other, with a result of compressing the cushion springs 17 and causing them to resist the descending movements of the main springs with cushioning action. Then, as the main springs again move upwardly, the rebound thereof is yieldingly resisted by the recoil springs 22, this arrangement providing for an easy movement of the main springs and the load carried thereby during either downward or upward movements of said springs. In the operation of the main springs, the cushion springs and the recoil springs, and the spring arms 7, assist materially in minimizing the transmission of shocks to the body of the vehicle, for the reason that these springs arms yield to a limited degree under the strain incident to sudden movements of the main springs.

In the use of vehicle springs of the kind herein referred to and which are pivotally connected to the axle by which the main springs are supported, there is opportunity afforded for the axles swinging in arcs of circles beneath the springs when the wheels fitted to the axles strike obstructions or move into depressions in a roadway. When movements of the axle of this nature take place, the axle, or parts carried thereby, move suddenly into contact with the main springs with resultant shocks that will be obvious. To prevent shocks due to the movements of the axles, I utilize a cushioning device that serves to control the swinging movement of the vehicle axles under the conditions referred to. This cushioning device comprises the following parts: 27 designates a bolt that extends vertically through an aperture $x$ in one of the main springs X, near the inner or pivoted end of said main spring, and the head of which rests upon the upper surface of said spring. The bolt 27 extends downwardly and through the ear block 2, and the seat member 1 carried by the axle and is provided at its lower end with a nut 28. Interposed between the under side of the seat member 1 and the nut 28 upon the bolt 27 is a lower cushion spring 29. Beneath the lower side of the main spring and surrounding the bolt 27 is an upper cushion spring 30, the lower end of which is shown in Fig. I as resting upon the seat member 1, but which may, if desired, rest upon the ear block 2.

When swinging movement of the axle in either direction takes place, one of the cushion springs 29 or 30, according to the direction in which the axle swings, acts to yieldingly resist the movement of the axle, with the result of preventing it, or any part carried thereby, from striking against either of the main springs to cause shock by impact therewith.

I claim:—

1. The combination in a shock absorbing device, of a pair of laminated main springs, one of the laminations of each main spring being bent at an angle to the body of the spring to provide a spring arm, and a cushioning spring interposed between the spring arms.

2. The combination in a shock absorbing device, of a pair of laminated main springs, one of the laminations of each main spring being bent at an angle to the body of the spring and then backwardly to the body of the spring to provide a spring arm, and a cushioning spring interposed between the spring arms.

3. The combination in a shock absorbing device, of a pair of laminated main springs, one of the laminations of each spring being bent at an angle to the body of the spring and then backwardly to the body of the spring to provide a spring arm, means for holding the terminal ends of the spring arms to the bodies of the springs, and a cushion spring interposed between the spring arms.

4. In a shock absorber, the combination with an axle, of a spring device mounted transversely of and on a pivot parallel to said axle, and means for resisting the swinging movement of said axle relative to said spring device.

5. In a shock absorber, the combination with an axle, of a spring device mounted transversely of and on a pivot parallel to said axle, and means for yieldingly resisting the swinging movement of said axle relative to said spring device.

6. In a shock absorber, the combination with an axle, of a pair of main springs mounted transversely of and on a pivot parallel to said axle, and means associated with one of said main springs and said axle for resisting the swinging movement of said axle relative to said spring device.

7. In a shock absorber, the combination with an axle, of a pair of main springs mounted transversely of and on a pivot parallel to said axle, and means associated with one of said main springs and said axle for yieldingly resisting the swinging movement of said axle relative to said spring device.

8. In a shock absorber, the combination with an axle provided with a spring seat located aside from the axis of the axle, of a pair of main springs pivotally connected to said axle, and a cushioning device interposed between one of said main springs and the spring seat carried by said axle for resisting the swinging movement of the latter.

9. In a shock absorber, the combination with an axle, of a pair of main springs pivotally connected to said axle, a seat member carried by said axle, a vertical member extending through one of said main springs and said seat member, and a cushion spring associated with said vertical member and bearing against said seat member.

10. In a shock absorber, the combination with an axle, of a pair of main springs pivotally connected to said axle, a seat member carried by said axle, a vertical member extending through one of said main springs and through said seat member, and cushion springs associated with said vertical member between said main spring and seat member and beneath said seat member.

11. In a shock absorber, the combination with an axle, of a pair of main springs, a hollow pivot bolt connecting the inner ends of said main springs to said axle and having perforations in its wall, and an oil cup fitted to said pivot bolt.

FRANK G. KOEHLER.

In the presence of—
H. G. COOK,
E. B. LINN.